March 27, 1973 R. KORPMAN 3,723,170
PRESSURE-SENSITIVE ADHESIVE TAPE
Filed Dec. 5, 1969
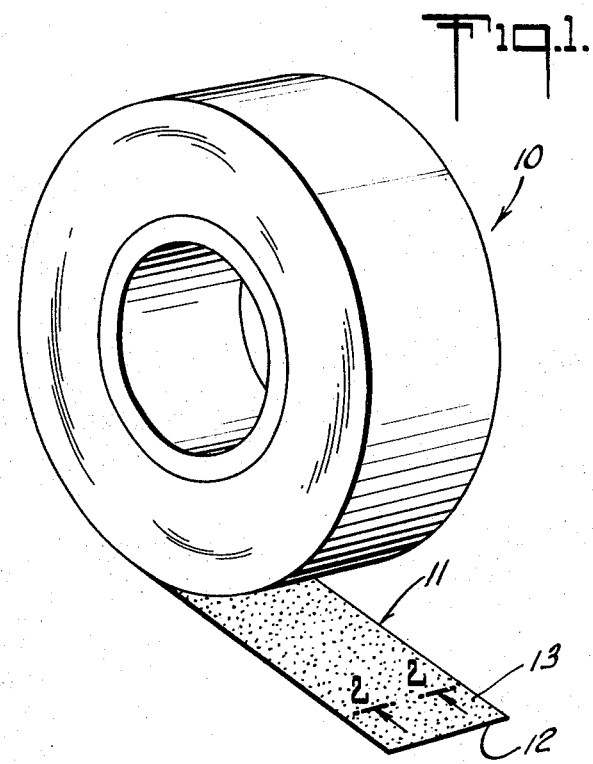
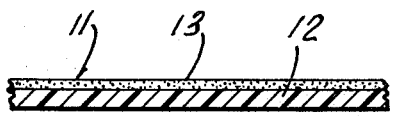
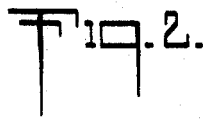
INVENTOR
RALF KORPMAN
BY
Charles A. Harris
ATTORNEY United States Patent Office 3,723,170
Patented Mar. 27, 1973

3,723,170
PRESSURE-SENSITIVE ADHESIVE TAPE
Ralf Korpman, East Brunswick, N.J., assignor to
Johnson & Johnson
Filed Dec. 5, 1969, Ser. No. 882,570
Int. Cl. C09j 7/02
U.S. Cl. 117—122 P                           7 Claims

ABSTRACT OF THE DISCLOSURE

A pressure-sensitive adhesive tape with improved properties at elevated temperatures within the range of about 212°–280° F. This tape is based on an adhesive wherein a major proportion by weight of the elastomers is an elastomeric and thermoplastic block polymer of the structure ABA, wherein A is a thermoplastic polymer block of styrene possessing a number average molecular weight of about 12,000–30,000, and B is an elastomeric polymer block of isoprene possessing a number average molecular weight of at least about 100,000, and wherein the styrene A blocks compose about 10–35 percent by weight of the block polymer.

The present invention relates to pressure-sensitive adhesive tapes which are normally tacky and are intended to be applied to a surface merely by pressing the adhesive side of the tape against the surface.

In the past, the best balance of properties in uncured pressure-sensitive adhesive tapes has been attained with adhesives based principally upon crude rubber, i.e., in the natural state, in combination with resin tackifiers, antioxidants and other additives. Since crude rubber has a very high molecular weight and therfore is much too viscous to process, it must be milled to break it down or reduce its molecular weight to the point where it can be dissolved in solvents and processed. Typically, crude rubbers used in the manufacture of pressure-sensitive adhesive tapes have been broken down to a molecular weight in the range of about one-half million to one million to assure that the adhesive can be coated at a solids level of between about 25 and 40%. This molecular weight range is at best a compromise since higher molecular weight crude rubbers are known to give better adhesive properties with respect to aging and high temperature performance, whereas lower molecular weight crude rubbers can be dissolved at higher solids and therefore processed more economically. Thus, uncured tapes manufactured within this practical range of molecular weight and coating solids have had many shortcomings. For instance, they have been subject to adhesive flow on aging and the rolls in which they are wound distort and form gaps between the layers, especially when aged at elevated temperatures. Furthermore, substantial costs have been involved in breaking down the crude rubber by milling.

To overcome the undesirable flow properties of the above-described crude rubber adhesives, precured adhesive tapes based upon more expensive heat curable adhesive formulations have been adopted for many product constructions. However, the manufacture of precured adhesive tapes is also costly, and difficult to control. High temperature curing ovens must be attached to the coaters for this purpose and adequate means must be provided for exact control of curing conditions since curing temperatures and times are extremely critical. Insufficient cure will not provide adequate performance while excessive cure will detract from tack and other qualities. Thus, it is common for waste to increase because of inadequate curing controls in the manufacture of these precured tapes. Thus, there is a great need for uncured pressure-sensitive adhesive tapes which perform well at elevated temperatures.

I have discovered that an optimum balance of cohesive and adhesive properties, i.e., tack, hold, splitting resistance, roll stability, etc., may be attained for the first time in uncured adhesive tapes according to my invention at elevated temperatures within the range of about 212°–280° F. when the adhesive elastomers are based upon a specific type of elastomeric and thermoplastic block polymer of the structure ABA. Furthermore, the tapes of my invention may be produced much more cheaply than the closest comparable tapes of the prior art. The prior art milling operation is eliminated because these block polymers may be dissolved quickly at relatively high, i.e., 50–60%, solids, and many economies then result from the small amount of solvent needed in the coating operation.

In the block polymer of this invention, A is a thermoplastic block of styrene possessing a number average molecular weight of about 12,000–30,000, B is an elastomeric polymer block of isoprene possessing a number average molecular weight of at least about 100,000, and the thermoplastic A blocks compose about 10–35% by weight of the block polymer. Preferably, the number average molecular weight of the individual A blocks is about 14,000–20,000 and that of the B blocks is not above about 200,000, and the amount of styrene in the block polymer is 12–25%. The elastomeric polymer block B is polymerized from isoprene either alone or in conjunction with other monomers while the thermoplastic A blocks are polymerized from styrene or styrene homologues.

The above described ABA block polymer may be used as the sole elastomeric constituent of the adhesive, or the adhesive may include a minor amount by weight of the total elastomers of an additional more conventional diene elastomer such as natural rubber, or polymers based on butadiene, isoprene, butadiene-styrene (SBR rubber), butadiene-acrylonitrile (NRB rubber), butyl rubber, or the like, and also may include other block polymers based on such diene elastomers. When the term "total elastomers" is used herein it shall mean the aggregate of the elastomeric and thermoplastic block polymer and any additional diene elastomer.

The adhesive of my invention, then, is formulated with a major proportion of the total elastomers being an ABA block polymer of the above type, in combination with about 25–125 parts by weight of the total elastomers, preferably 40–100 parts, of a tackifier resin for said elastomers. Any conventional compatible tackifier or mixture of tackifiers such as rosin derivatives, polyterpenes, coumarone indenes, or hydrocarbon resins may be used. The preferred tackifier resin of this invention is a resin derived from a $C_5$ stream of aliphatic petroleum derivatives and containing a majority of structures derived from piperylene and/or isoprene. This class of resins gives an optimum balance between tack and high temperature properties.

Antioxidants and heat stabilizers normally are added to provide adequate performance and storage life for the adhesives. A small amount, i.e., 1–2 parts, of a hindered phenol or a di-alkyl hydroquinone may be used as an antioxidant, and aliphatic or aromatic amines may be used if discoloration is not harmful. Zinc dibutyl dithiocarbamate, as disclosed in United States Letters Patent No. 2,615,059, is a preferred heat stabilizer. Fillers, extenders, pigments and coloring agents may be added as desired to lower cost, alter physical properties, and/or to change the appearance of the adhesive. Titanium dioxide or zinc oxide may be used to make the adhesive white and/or opaque.

The adhesive of this invention may be applied to its backing substrate by any of the coating techniques conventionally used for this purpose in the adhesive tape industry. It is particularly well adapted to solvent coating because of the relatively low viscosity and/or high solids obtainable as compared to conventional crude rubber adhesives. The tape of this invention may employ any conventional backing, such as paper, cloth, film or metal foil, and the adhesive may be coated on only one or both sides of the backing, depending upon the intended use.

As indicated hereinbefore, the tapes of this invention perform well at elevated temperatures. For instance, the adhesives of this invention have an adhesive splitting temperature of at least about 212°, preferably about 225° F., and range in splitting temperature to as high as 280° F. or more. By splitting temperature, we refer to that temperature at which the internal strength of the adhesive becomes so weak that the adhesive will split and transfer when a tape coated with the adhesive is removed from a chrome plated metal panel such as a Ferrotype panel used by the photographic industry. In general, the splitting temperature of a given adhesive of this invention bears a direct relationship to the number average molecular weight of the individual styrene A blocks so that, as the molecular weight of the A blocks increases from 12,000 to 30,000, the splitting temperature of the adhesive increases gradually and roughly proportionately in the direction of 280° F. However, when the molecular weight of the A blocks falls below about 12,000, the splitting temperature of the resulting adhesive drops precipitously. Thus, the adhesive tapes of this invention will exhibit fairly constant adhesive splitting temperatures for block polymers having given theoretical block weights, despite whatever slight variations in A block weights may occur in the production of the polymers. Due to the above properties, the uncured adhesive tapes of this invention can be used in a much wider range of applications than heretofore and make possible many economies. Another advantage is improved aging. Storage at elevated temperatures, such as in the roof sections of a warehouse will not markedly affect these tapes. Furthermore, edge exudation, roll distortion, gearing, gapping and telescoping will be minimized in the tapes of this invention.

Other and further advantages of this invention will appear to one skilled in the art from the following description, examples and claims; taken together with the drawings wherein: FIG. 1 is a view in perspective of a roll of tape according to one embodiment of the invention and FIG. 2 is a greatly enlarged sectional view taken along the line 2—2 of FIG. 1.

Referring to the drawings; there is shown a roll 10 of pressure-sensitive adhesive tape 11, according to one embodiment of this invention, which comprise a flexible backing sheet 12 and a layer of pressure-sensitive adhesive 13 coated on one major surface of said backing. The tape 11 normally is wound upon itself around a core 14 with the adhesive side of the tape facing inwardlly toward the core. The backing sheet 12 may be a plastic film, paper, or any other suitable material and the tape may include various other layers or coatings, such as primers, release coatings, and the like, which are used in the manufacture of pressure-sensitive adhesive tapes.

The following examples are given only by way of illustration and are not intended to limit the scope of the present invention in any way. In the examples all proportions are given in parts per one hundred parts of the total elastomers unless otherwise shown. The series of styrene—isoprene—styrene (ABA) block polymers listed in Table A, below, were evaluated in the following standard adhesive formula with the results indicated:

| | |
|---|---|
| ABA block copolymer | 100 |
| Wingtack 95 tackifier | 80 |
| 2,5 ditertiary amyl hydroquinone | 1 |
| Zinc dibutyl dithiocarbamate | 2 |
| Toluene | 180 |

Wingtack 95 tackifier is a synthetic tackifier resin polymerized from a $C_5$ stream of aliphatic petroleum derivatives containing piperylene and isoprene, and which possesses a melting point of about 95° C. It is offered commercially by Goodyear Tire and Rubber Company.

TABLE A

| Polymer and adhesive properties | I | II | III | IV | V | VI |
|---|---|---|---|---|---|---|
| Percent styrene | 10 | 15 | 20 | 12 | 20 | 20 |
| Number average molecular weight: | | | | | | |
| Total polymer | 162,000 | 125,000 | 70,000 | 239,000 | 132,000 | 218,000 |
| Isoprene block | 146,000 | 106,200 | 56,000 | 210,000 | 105,600 | 174,400 |
| Styrene block | 8,000 | 9,400 | 7,000 | 14,500 | 13,200 | 21,800 |
| Splitting temperature, ° F. | 170 | 180 | 130 | 230 | 220 | 270 |
| Adhesion (ounces/in. width) | 60 | 36 | 42 | 47 | 40 | 55 |
| Quickstick | 0.7 | 0.5 | 0.3 | 1.0 | 0.6 | 0.5 |

These adhesives are coated at 1.5 ozs./sq. yd. dry weight on a conventional impregnated and backsized crepe paper backing sheet and dried in the usual manner. The tapes are then slit into rolls and evaluated for adhesion and quickstick by the standard tests used for pressure-sensitive tapes. The adhesive splitting temperature is determined by applying the tapes to a photographic Ferrotype panel and stripping the tape from the panel at elevated temperatures. The oven temperature is raised in 10° F. increments and the panel is conditioned 15 minutes at each temperature before a piece of the tape is stripped from the panel. The tape continues to strip clean, i.e., without leaving any real trace of adhesive on the panel, until the splitting temperature is reached when the adhesive deposits on the panel.

The polymers of Examples I–III represent controls wherein the number average molecular weight of the individual A blocks is substantially below 12,000 and those of Examples IV–VI are polymers useful in this invention wherein the number average molecular weight of the individual A blocks is well above 12,000. When formulated and coated in accordance with this invention, the polymers of Examples IV–VI provide tapes having adhesive splitting temperatures at least within the range of 212°–280° F., excellent adhesive strength, and satisfactory quickstick, as indicated. Furthermore, their adhesive flow properties are excellent and the tape rolls show excellent stability and do not distort or form gaps between the layers at the elevated temperatures found under the most extreme storage conditions.

The following examples employ another styrene-isoprene-styrene (ABA) block polymer of this invention, this time containing 25% styrene and having a total number average molecular weight of 177,000. This gives a styrene block number average molecular weight of 22,000 and an isoprene block weight of 133,000.

| Material and characteristics | VII | VIII |
|---|---|---|
| ABA block copolymer | 100 | 100 |
| Piccolyte A 135 tackifier | 60 | |
| Foral 105 tackifier | | 100 |
| 2,5 ditertiary amyl hydroquinone | 1 | 1 |
| Zinc dibutyl dithiocarbamate | 2 | 2 |
| Toluene | 169 | 200 |
| Splitting temperature, ° F | 300 | 275 |
| Adhesion (ounces/in. width) | 63 | 81 |
| Quickstick | 1.5 | 0.6 |

Piccolyte A 135 tackifier is an alpha pinene polymer with a melting point of approximately 135° C., offered by Pennsylvania Industrial Chemicals, and Foral 105 tackifier is a pentaerythritol ester of a highly stabilized resin offered by the Resins Division of Hercules Inc.

The above adhesive formulations are coated at 1.2 ozs./sq. yd. dry weight on a conventional impregnated and backsized crepe paper backing sheet and made into tapes and tested as described in connection with Examples I–VI.

As would be expected from the high A block molecular weight, i.e., 22,000, the splitting temperatures for Examples VII and VIII are quite high, i.e., 300° F. for Example VII. The lower splitting temperature of Example VIII illustrates that spitting properties may vary with the type and amount of tackifier employed, as between formulations using the very same block polymer or the same A block weight. Adhesion, quickstick and roll stability for the tapes of Example VII and VIII also compare favorably with these properties in the previous examples.

In all of the foregoing examples the number average molecular weights given for the isoprene and styrene blocks are "theoretical" in that they are calculated by multiplying the actual average percentage of styrene times the measured number average molecular weight of the total polymer to obtain the total weight of styrene. This figure then is divided by two to obtain the weight of the styrene A blocks and subtracted from the total polymer weight to obtain the weight of the isoprene B block.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. An uncured pressure-sensitive adhesive tape which comprises a flexible backing sheet and a layer of a normally tacky and pressure-sensitive adhesive coated on one major surface of said sheet, said adhesive comprising a major proportion by weight of the total elastomers of an elastomeric and thermoplastic block polymer of the structure ABA, wherein A is a thermoplastic polymer block of styrene possessing a number average molecular weight of about 12,000–30,000 and B is an elastomeric polymer block of isoprene possessing a number average molecular weight of at least about 100,000, said thermoplastic A blocks composing about 10–35 percent by weight of the block polymer, and about 25–125 parts per one hundred parts by weight of the total elastomers of a tackifier resin for said elastomers; and said tape possessing an adhesive splitting temperature of at least about 212° F.

2. A pressure-sensitive adhesive tape according to claim 1, wherein the individual A blocks possess a number average molecular weight of at least about 14,000.

3. A pressure-sensitive adhesive tape according to claim 2, wherein the A blocks compose about 12–25 percent by weight of the block polymer.

4. A pressure-sensitive adhesive tape according to claim 2, wherein the number average molecular weight of the B blocks is not above about 200,000.

5. A pressure-sensitive adhesive tape according to claim 1, wherein the number average molecular weight of the B blocks is not above about 200,000.

6. A pressure-sensitive adhesive tape according to claim 1, which possesses an adhesive splitting temperature of at least about 225° F.

7. A pressure-sensitive adhesive tape according to claim 1, wherein the A blocks compose about 12–25 percent by weight of the block polymer.

References Cited
UNITED STATES PATENTS

| | | | |
|---|---|---|---|
| 2,940,960 | 6/1960 | Tegge et al. | 260—85.3 |
| 3,239,478 | 3/1966 | Harlan | 260—45.85 X |
| 3,290,275 | 12/1966 | Brandt | 260—80.7 X |

MURRAY KATZ, Primary Examiner

B. D. PIANALTO, Assistant Examiner

U.S. Cl. X.R.

117—122 PF, 122 PA, 155 UA